United States Patent
Heinonen et al.

(10) Patent No.: US 6,379,437 B1
(45) Date of Patent: Apr. 30, 2002

(54) FILTER FOR GASES

(75) Inventors: Kimmo Heinonen, Tampere; Virve Christiansen, Kangasala, both of (FI)

(73) Assignee: Valtion Teknillinen Tutkimuskeskus, Espoo (FI)

(*) Notice: Subject to any disclaimer, the term of this patent is extended or adjusted under 35 U.S.C. 154(b) by 0 days.

(21) Appl. No.: 09/508,743

(22) PCT Filed: Sep. 21, 1998

(86) PCT No.: PCT/FI98/00739

§ 371 Date: Mar. 16, 2000

§ 102(e) Date: Mar. 16, 2000

(87) PCT Pub. No.: WO99/15259

PCT Pub. Date: Apr. 1, 1999

(30) Foreign Application Priority Data

Sep. 19, 1997 (FI) .................................................. 973728
Oct. 22, 1997 (FI) .................................................. 970462 U

(51) Int. Cl.$^7$ .............................................. B01D 53/04
(52) U.S. Cl. ............................... 96/135; 96/153; 96/154; 55/521; 55/527
(58) Field of Search ........................ 96/134, 135, 153, 96/154; 55/515, 516, 521, 527, 528

(56) References Cited

U.S. PATENT DOCUMENTS

| | | | | |
|---|---|---|---|---|
| 2,038,071 A | * | 4/1936 | Wilhelm | 96/153 X |
| 4,366,054 A | | 12/1982 | Kronsbein | |
| 4,391,616 A | | 7/1983 | Imamura | |
| 4,699,681 A | * | 10/1987 | Kasmark, Jr. et al. | 96/154 X |
| 5,120,331 A | * | 6/1992 | Landy | 96/153 X |
| 5,129,929 A | * | 7/1992 | Linnersten | 96/134 X |
| 5,188,644 A | * | 2/1993 | Landy | 55/333 X |
| 5,194,414 A | * | 3/1993 | Kuma | 96/153 X |
| 5,316,676 A | | 5/1994 | Drori | |
| 5,352,274 A | * | 10/1994 | Blakley | 96/153 X |
| 5,609,761 A | | 3/1997 | Franz | |
| 6,200,368 B1 | * | 3/2001 | Guerin et al. | 96/154 X |

FOREIGN PATENT DOCUMENTS

| | | | |
|---|---|---|---|
| EP | 0 399 730 | 11/1990 | |
| EP | 0 504 389 | 10/1991 | |
| EP | 0 457 402 | 11/1991 | |
| FI | 94724 | 7/1995 | |
| FR | 2199479 | 4/1974 | |
| GB | 1 582 758 | 1/1981 | |
| JP | 03-118816 | * 5/1991 | 96/153 |
| JP | 05-154329 | * 6/1993 | 96/154 |
| JP | 06-071128 | * 3/1994 | 96/154 |

* cited by examiner

Primary Examiner—Robert H. Spitzer
(74) Attorney, Agent, or Firm—Connolly Bove Lodge & Hut LLP

(57) ABSTRACT

A filter for gases, particularly for ventilation, is provided with elongated flow channels (3) which are at least partly formed by superimposing material layers (1) between which the flow channels (3) are formed so that their starting ends are open to a gas inlet (A) and their terminal ends are open to a gas outlet (B), wherein the gas flow between the starting ends and the terminal ends in the channels (3) is arranged parallel to the planes of the material layers (1), and the layers contain an adsorbent in which impurities are adsorbed from the flow in the channels (3). The material layers have, on top of each other, at least one support layer (1a) and a porous adsorbent layer (1b) kept in place by the support layer (1a). The channels (3) are formed between spacers (2) which contain porous adsorbent material, constitute elevated areas on the material layers (1), and keep them separate at the channels (3). The channels (3) are enclosed on all sides by porous walls through which there is a flow connection to the adsorbent material surrounding the channels on all sides.

14 Claims, 4 Drawing Sheets

FILTER FOR GASES

The invention relates to a filter for gases, which is of the type presented in the preamble of the appended claim 1.

Such a gas filter is intended, e.g. when placed in a ventilation duct, to remove gaseous impurities from inlet air of a room.

Harmful gases are commonly removed from incoming air with filters which are placed in the ventilation duct and which contain a granular material having a large specific surface. Gases to be filtered out with such filters include e.g. sulphur dioxide, oxides of nitrogen, chlorine, hydrogen chloride, and ozone.

In addition to ordinary working rooms and lounges, there are a group of special rooms where considerably higher requirements are set for the purity of air. Such special rooms include e.g. so-called clean rooms, where e.g. components for sensitive electronic devices and/or such devices are manufactured. Also the spaces where these devices are used must often be protected even with device-specific filters, to secure their reliable function.

The filtration of incoming air has been and will be increasingly used substantially also in connection with various vehicles and work machines, where particularly the filtration of exhaust gases is important, as well as the filtration of such impurities, which are handled by using the vehicle or work machine (e.g. spreading of pesticides with a tractor).

It is generally known to raise the filtration efficiency of filters by increasing the time of contact or retention between the filter material and the air to be filtered, e.g. by increasing the thickness of the filter, i.e. the thickness of the layer through which the air to be filtered flows. A problem in this case, however, is the increasing pressure loss, which is not advantageous for the operation of the ventilation system.

Figure 8:
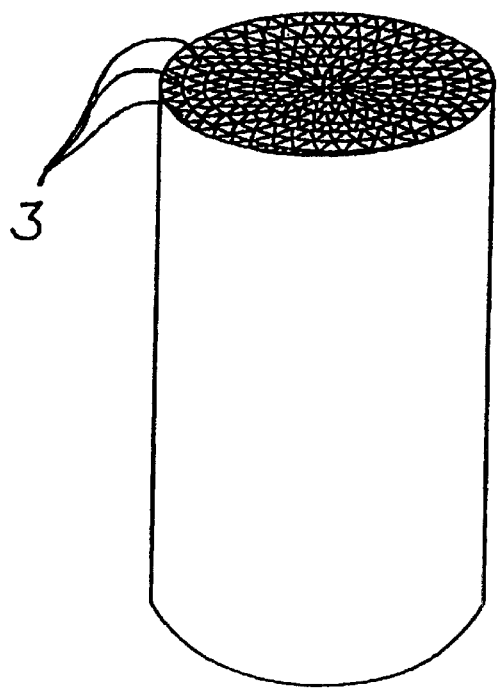
Figure 9:
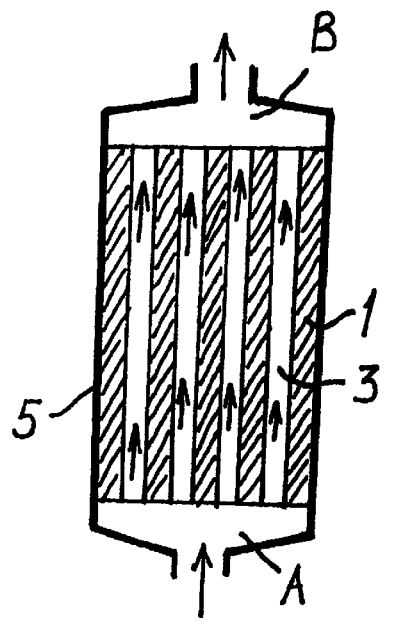

A filter is known from French patent 7232725 (publication number 2199479) where the flow of gas to be filtered is intended to pass through a filter material layer. Such layers can consist of two fibre material layers and a granular adsorbent placed therebetween. In the actual filter structure, these layers can be placed in parallel to form a stack, or, as shown in FIGS. 8 and 9 of the publication, wound in a spiral form and placed in a housing, wherein the material to be filtered is passed in the axial direction and simultaneously from the core of the spiral outwards.

Furthermore, European patent publication 504389 discloses a filter structure in which the material to be filtered is intended to pass through layers of a filter material wound in a spiral form, from the core outwards. The filter material is produced by blending adsorbent granules with adsorbent fibres.

Also in these filters, when a gas to be purified is passed through the filter material containing an adsorbent, one must consider the flow resistance caused by the material, with the problems presented above.

Finnish patent FI-94724 discloses a method for manufacturing a filter for gases, wherein the filter is composed of superimposed layers made of a carrier material which is corrugated and impregnated with a solution inducing chemisorption, whereby the longitudinal direction of the waves coincides with the direction of passage of air, and the layers make up separate, elongated flow cells. The carrier material is an aluminium sheet coated on both surfaces with alumina which makes a porous surface. Such a filter does not induce flow resistance to the air to be filtered, but a considerably larger contact surface is achieved in the same volume than by using granular materials. A filter with the same basic structural type is also known e.g. from U.S. Pat. No. 4,391,616.

It is an aim of the present invention to present a novel type of filter structure which combines small flow resistance and good filtration efficiency, thanks to the large surface area. For achieving this aim, the filter according to the invention is primarily characterized in what will be presented in the characterizing part of the appended claim 1.

In the filter, the adsorbent filter material constitutes also the walls separating the longitudinal flow channels. In these flow channels, the flow takes place between their starting and terminal ends in the direction of the filter material, i.e. the filter material adsorbs the specified impurities from the passing gas flow. In the filter material layer, which extends primarily in the direction of one plane, there are at least two superimposed layers: a porous support layer and a porous adsorbent material layer. Furthermore, the filter material layers are separated by elevated areas deviating from the main direction of the filter material layer, such as elongated spacers rising from the surface of the material layer which has otherwise an even thickness, or tops of waves in a corrugated material layer with a substantially even thickness, which also contain porous adsorbent material in their inner volume. The filter material layers can be multilayer structures in such a way that on one side of the support layer there is an adsorbent material layer forming the porous outer surface of the filter material layer, or the filter material layer has preferably a structure where the layer of the adsorbent material is placed between two porous support layers, wherein the support layers constitute on both sides the outer surface of the filter material layer.

The elongated flow channels are thus limited in the directions perpendicular to the flow direction by walls containing an adsorbent: in the directions perpendicular to the filter material layers on opposite sides by the areas between the spacers of the filter material layer or the wave bottoms of a corrugated material layer and a straight material layer, and in the direction of the filter material layers on opposite sides by said spacers or, correspondingly, the wave tops of a corrugated material layer.

In view of other advantageous embodiments, reference is made to the appended dependent claims and the description below.

Figure 1:
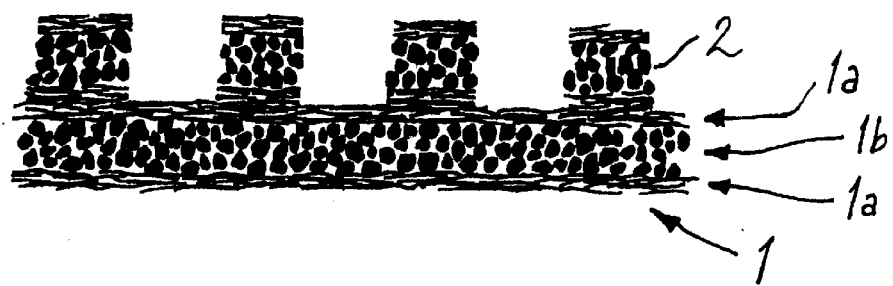
Figure 2:
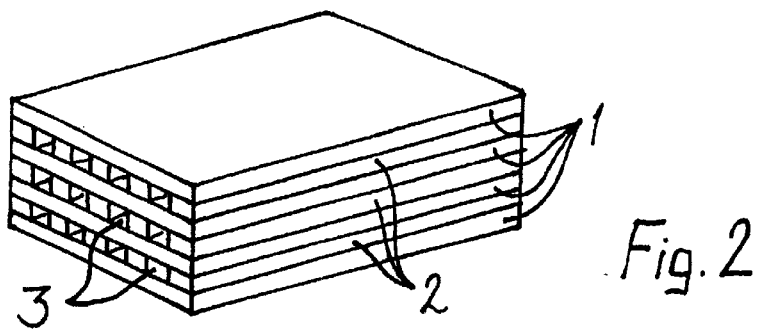
Figure 3:
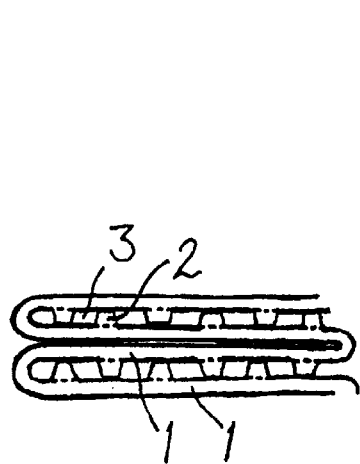
Figure 4:
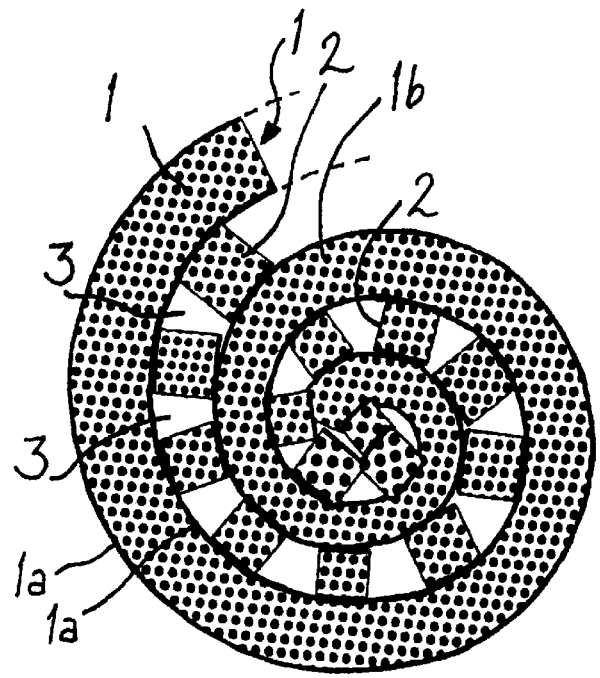
Figure 5:
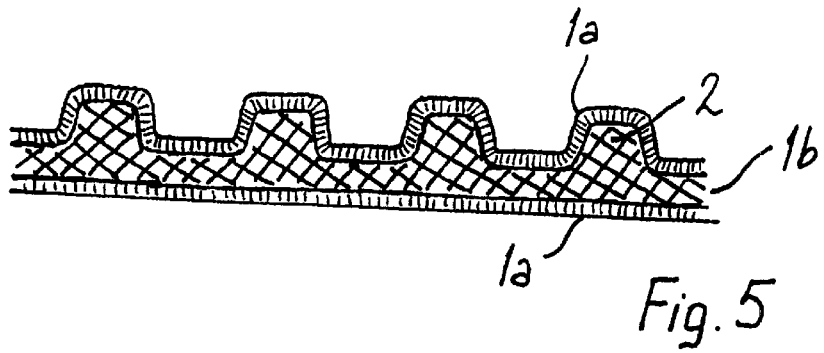
Figure 6:
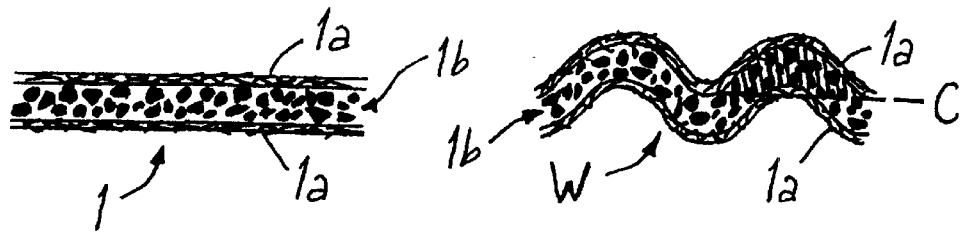
Figure 7:
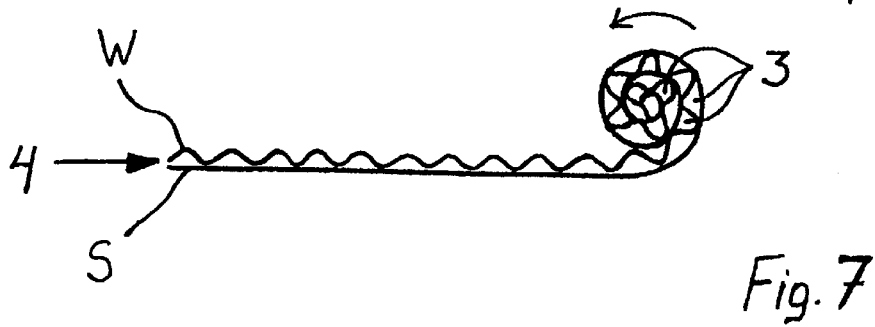
Figure 10:
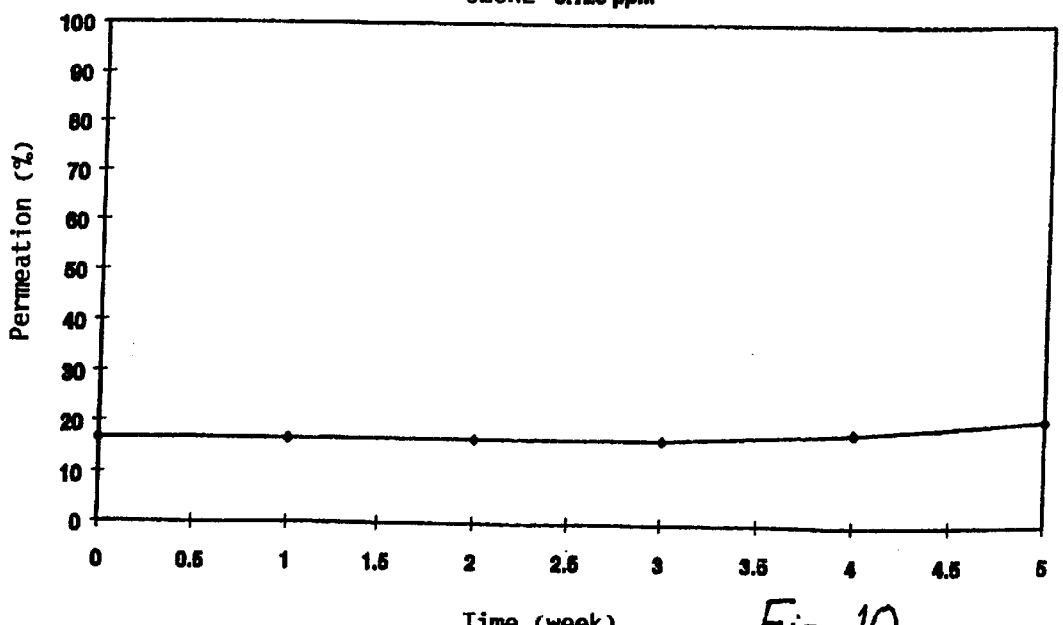
Figure 11:
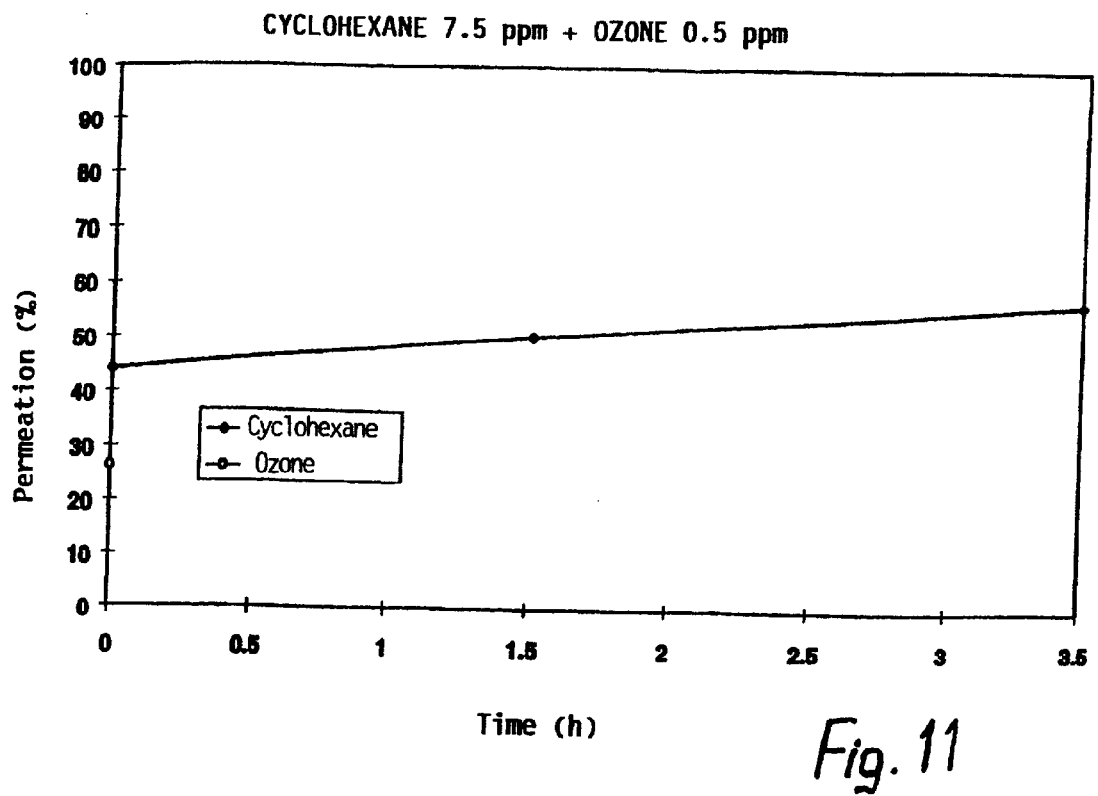
Figure 12:
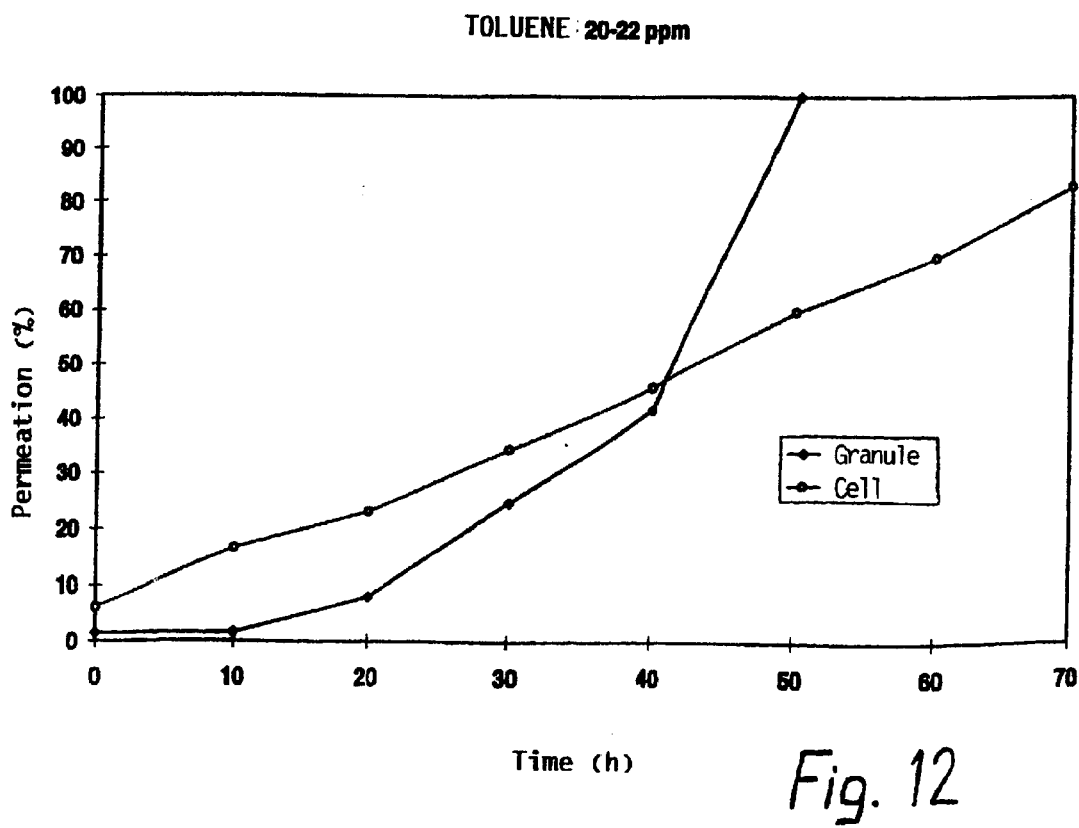

In the following, the invention will be described in more detail with reference to the appended drawings, in which FIG. 1 shows a filter material to be used in a filter according to the invention, in a cross-sectional view, FIG. 2 shows one structure for the filter according to the invention in a perspective view, FIG. 3 shows a second structure for the filter according to the invention in a cross-sectional view perpendicular to flow channels, FIG. 4 shows a third structure for the filter according to the invention in a cross-sectional view perpendicular to flow channels, FIG. 5 shows an advantageous alternative for the filter material in a cross-sectional view, FIG. 6 illustrates a filter material to be used in the filter, FIG. 7 illustrates the formation of a filter from the material according to FIG. 6, FIG. 8 shows a filter produced of the material of FIG. 6 in a perspective view, FIG. 9 illustrates the functional principle of a filter according to the invention in a longitudinal section in the direction of the channels, and FIGS. 10 to 12 show results of tests made with the filter.

The filter material layer to be presented in the following description comprises a porous adsorbent material layer which is kept in position by a support layer. The support layer constitutes a support structure for the filter, and it can be used to make the filter as a stable structure with a desired shape, and the porous adsorbent material which has relatively poor strength properties can thus be formed in the desired shape.

FIG. 1 shows a material layer to be used as a structural element in a filter according to the invention. The material layer consists of a filter material which forms a layer 1 with a substantially even thickness. The layer is composed of three sublayers, i.e. two support layers 1a of gauze-like non-woven fabric constituting the outer surfaces of the layer, and a layer of granular adsorbent placed therebetween and forming a porous adsorbent material layer 1b.

Furthermore, FIG. 1 shows elongated strips, separated from each other and extending substantially in mutual parallel relationship, placed on top of the layer. These strips can have the same structure as the material forming the layer 1, whereby they may be cut as narrower strips off the wider planar material used for the layer 1, and placed on top of the layer 1. The strips form thus elongated elevations on the material layer 1, acting as spacers 2 to separate superimposed layers 1.

FIG. 2 shows a possible filter, or cellular filter structure, that can be fabricated by using the filter material. The layers 1 of the material in FIG. 1, with separate strips placed on top of them, are superimposed, thereby forming elongated parallel flow channels 3 extending along the planes of the layers. Single channels 3 are limited on one hand by spacers 2 separating the layers 1 and consisting of these narrower strips of the filter material described above, and on the other hand by the layers 1 of the filter material. Thus, all the walls of the flow channel 3 consist of the filter material, i.e. they contain porous adsorbent material. In the cellular structure obtained, air is passed in the channels 3, and the gaseous substances to be filtered out are fixed to the walls of the channels 3. All the wall surfaces of the channels are porous, because, at the uniform layers of the filter material, they consist of the porous support layer 1a which is very permeable to gases, and at the spacers 2, they consist directly of the porous adsorbent material.

In case the outer surface of the filter material layer consists of porous adsorbent material on one side and of the porous support layer 1a on the opposite side, the walls of the channels 3 are limited by the porous support layer on the side of the first filter material layer and by the porous adsorbent material on the side of the second filter material layer. It is also possible to pile the layers so that similar sides come against each other.

FIG. 2 shows a cellular structure having the form of a rectangular prism which is easy to form for example by cutting into the shape determined by a given use.

A similar stack structure can also be produced by folding a continuous planar material in such a way that successive portions of the same material form parallel superimposed layers 1 in the cellular structure. This principle is shown in FIG. 3, in which the elevations on the material layer 1 are intermeshed when turning the surfaces comprising the elevations against each other in the fold, whereby these elevations are naturally distributed at sufficient spacings on the surface of the material layer. The smooth surfaces on the other side come against each other in the same way.

FIG. 4 presents another alternative, in which the basic principle of the structure is the same as in FIG. 2. Here the cellular filter structure is formed by winding the same planer filter material to a roll, whereby superimposed filter material layers 1 consist of successive portions the same material connected to each other in a continuous manner. Also this kind of a material can be originally similar to that shown in FIG. 1, whereby the strips on top of it form the above-described spacers 2 upon winding. Thus, in its cross-section perpendicular to the through channels 3, the obtained cellular filter structure has a spiral form. Also this kind of a filter cell can be formed at its ends e.g. by cutting to the desired shape.

Before forming the cellular structure, the spacers 2 can be attached to the surface of the layer 1 in a suitable manner, e.g. by utilizing fibres of the support layer 1a present in the layers 1 and/or in the spacers 2, which fibres can be for example thermally bondable fibres, whereby the layer and the spacers can be attached together by heat. Also gluing can be used. The final cellular structure, i.e. a stack or a roll, can be kept together mechanically, e.g. by placing it in a suitable housing.

FIG. 5 shows an advantageous alternative for the structure of the material layer 1. Whereas in FIG. 1, the elevations acting as spacers 2 are placed as separate pieces on top of the material layer, the elevations are here of the same material layer, wherein their outermost layer is simultaneously the continuous outermost layer of the material layer, in this case the porous support layer 1a. In practice, the structure of the figure can be manufactured by introducing a layer 1b of adsorbent particles between two support layers a using a suitable multi-layer web formation method, whereafter the resulting multi-layer structure is passed between two pressing surfaces, such as rolls, whereby one of the rolls has a grooved surface which makes the desired pattern on one surface of the material layer 1. In view of this mechanical working stage, the surface layer, i.e. support layer, on whose side the elevations are produced, can be wider than the surface layer on the opposite side, because the working makes it narrower in the width direction. Although FIG. 5 illustrates elevations which have approximately straight flanks and a rectangular or trapezoid cross-section, it is also possible, by proper selection of the working pressing surface, to make a different shape, for example a corrugated surface. However, the difference to known filter materials made of corrugated carrier materials is here that the thickness of the material layer 1 varies because of the elevations, and in the thickness direction, there is more porous adsorbent material in than between the elevations.

FIG. 6 shows further a possible carrier material for a filter according to the invention in straight and in corrugated form. The carrier material, by means of which the flow channels are made, is a structure obtained by corrugating a material layer 1 with an even thickness. The layered structure of the material layer 1 consists of three layers, i.e. two support layers 1a of a gauze-like non-woven fabric constituting the outer surfaces of the layer, and a layer of a granular adsorbent placed there-between and forming a porous adsorbent material layer 1b. The support layers 1a on opposite sides of the layer 1b have been corrugated in a corresponding manner and their waves are in alignment.

The filter according to the invention is made of a corrugated carrier material W and a straight carrier material S. The materials S, W treated in this way are placed on top of each other, thereby producing a layer 4 containing adjacent flow channels 3. The materials S, W can be attached to each other e.g. with a binding agent. For producing the finished filter, layers 4 are superimposed tightly so that on both sides of the corrugated material W there is always the straight layer material S, wherein individual flow cells 3 are formed on both sides of the corrugated layer material W between the same and the straight layer material S.

FIG. 7 discloses also a way of forming a filter according to FIG. 8, wherein the layer 4 is wound into a tight cylindrical piece which can be easily placed e.g. inside a ventilation pipe with a circular cross-section. If the support layer 1a contains thermally bondable fibres, the carrier materials W, S can be bonded into the layer 4 by utilizing the heat-sealability of the support layers.

It is obvious that other kinds of structures can also be used to form the filter. Several pieces of separate layers 4 can be placed on top of each other into a tight stack, or a stack can be made by folding of one wide layer 4, wherein its successive portions come on top of each other. A stack compiled in this way can be easily formed further e.g. in its cross-section to comply with the requirements of the use in question.

By using materials W, S which have a porous surface and contain a porous adsorbent, and by forming thus a cellular adsorbent structure, a substantial increase is obtained in the adsorbing surface area also in the embodiment of FIGS. 6 to 8, without causing any significant increase in the flow resistance, because the air to be purified flows along the channels and the gaseous substances to be filtered out can pass to the adsorbent material through the support layers 1a forming the walls of the channels 3. Furthermore, there is the feasible alternative that the porous adsorbent material layer 1b constitutes directly the second outer surface of the carrier materials W, S, wherein the porous walls of the channels 3 are at least partly composed of the porous adsorbent material layer 1b.

The filter according to the embodiment of FIGS. 6 to 8 can be manufacture by methods in which a layer 1b of adsorbent particles is introduced between two support layers 1a by a suitable multi-layer web formation method, after which the corrugated material W can be made on a corrugated board manufacturing machine by a method known in the paper industry.

In the structures of FIGS. 1 and 5, the spacers 2 constitute elevated areas deviating from the main direction of the material layer 1 and containing porous adsorbent material in their inside. For example, the cross-section of the elevated area (spacer 2) above the top surface of the constant-thickness portion extending parallel to the main direction of the material layer is, in the area inside the possible porous surface layer material, mostly (more than 50 vol-%, preferably more than 75 vol-% of the solid matter) composed of porous adsorbent material.

Similarly, in the corrugated material W of FIG. 6, the tops of the waves make elevated areas deviating from the main direction of the material layer 1 and containing porous adsorbent material in their inside. For example, the cross-section of the area between the plane parallel to the main direction of the material layer and tangential to the wave bottom opposite the wave top (broken line C, FIG. 6) and the outer surface of the wave top is, in the area inside the porous surface layer material, mostly (more than 50 vol-%, preferably more than 75 vol-% of the solid matter) composed of the porous adsorbent material.

FIG. 9 illustrates the functional principle of the filter in a schematic side view. The flow channels 3 extend substantially parallel to each other through the whole cellular filter structure so that their starting ends are open to a gas inlet A and their terminal ends are open to a gas outlet B. The layers 1 of the filter material and the strips on top of them or the corrugated forms in them constitute the walls which surround the flow channels in directions perpendicular to their main flow direction and receive impurities in a direction transverse to the main flow direction from the gas to be filtered flowing in the channels. The housing, in which the cellular filter structure is placed, is indicated with the reference number 5.

There are several alternatives for the layers of the filter material. A large adsorption surface is obtained in the walls by placing separate adsorbent particles between two porous support layers 1a. These support layers consist advantageously of fibres joined together, between which gas can penetrate into the adsorbent. Such a fibrous layer can consist of an open non-woven fabric or gauze. The raw materials for the fibrous layer can be e.g. synthetic fibres, such as thermally bondable fibres containing a thermoplastic material. The fibrous layer can also be of porous paper. In general, the support layer 1a should be such that at those points where it forms the wall for flow channels 3, gas can penetrate through the support layer 1a to come into contact with the porous adsorbent material on its other side.

On the other hand, there are several alternatives for the porous adsorbent material. The porous adsorbent material layer 1b can be produced with separate adsorbent particles which can in principle be of any known granular or fibrous material, such as activated carbon. A wider porous structure formed of fibres is also feasible, such as a woven, non-woven or knitted fabric; there can be one or several of such fabrics on top of each other in the adsorbent material layer. Also these structures can consist of activated carbon. The adsorbent can naturally be selected according to the gas to be removed, and the adsorption can thus be physical sorption or chemisorption, wherein the adsorbent material has been impregnated with a corresponding chemical. Naturally, the adsorbent, whether present in separate particles or in a wider porous structure, should not be packed too tightly in the layer 1b so that gas can pass between the particles, and this is important particularly when using fibrous particles.

When separate adsorbent particles are used, they are well contained within the wall, because they are placed between the support layers 1b, and the support layers keep them in position, wherein they can be relatively loose in relation to each other, which increases the filtration surface. This is a good way to bind particularly a granular adsorbent as the filtration material. However, it is possible to place the adsorbent particles on one side of the porous support layer 1a to form one of the outer surfaces of the filter material layer 1, wherein they can be bound e.g. with particular binder fibres to this layer acting as the support structure. In the structures of FIGS. 1 and 5, it is possible to arrange a porous adsorbent material layer 1b on both sides of the support layer 1a, wherein the support layer 1a can be also closed, without a possibility for a gas to flow through the same. Separate adsorbent particles in the form of staple fibres, or larger porous structures formed of fibres, can particularly be attached in this way to the surface of the support layer 1a.

Also in the structural alternative in which the porous adsorbent material layer 1b is outermost in a multi-layer structure, the spacers can be formed, according to the principle presented above, either of separate strips containing adsorbent material, or of thicker elongated areas of the same layer 1b.

The invention is not limited solely to the alternatives presented above, but it can be modified within the scope of the inventive idea presented in the claims. Although it was presented above that the separate strips which constitute the spacers to keep the layers separate in the finished filter can be cut from the same filter material which is used to form the layers, these can also be made as separate pieces containing adsorbent particles. Thus, they can be e.g. elongated pieces in which the adsorbent is enclosed in a porous support layer, such as a fibre gauze, surrounding the adsorbent on all sides in directions perpendicular to the longitudinal direction of the piece. Also, these spacers can contain a porous adsorbent material in a different structure than the adsorbent material layer 1b.

The granule size of the granular adsorbent used can vary from coarse to fine. Similarly, the fibre sizes of the fibrous adsorbent can vary. The thickness of the layers 1 of the filter material, i.e. the thickness of the walls in the flow channels 3, can vary, and most commonly it can range from 1 to 10 mm. With small fibres and small adsorbent particle sizes, it is possible to produce materials having a thickness of 1 mm, and on the other hand, with some material selections, the layer thickness can be 1 cm.

The material layer can contain also other parts than the materials of the support layer 1a and the porous adsorbent material; for example, particularly adsorbent particles can be blended with binders, especially binder fibres which are used to consolidate the layers of adsorbent particles and to bind them with other layers. The proportion of the binders must be small so that they do not induce an excessive reduction in the adsorption surface.

It is also possible that there are more than three layers in the filter material layer 1, for example in a way that the support layers 1a and the adsorbent layers 1b alternate in the same layer 1.

The invention will be illustrated with the following example which is not restrictive.

Permeation and Capacity Measurements of Gas Filter Cell

1. Structure of Cellular Gas Filter Structure

The tested cellular gas filter structure was made of a three-layer material with activated carbon granules (diameter ca. 1 mm) between two synthetic fibre layers. The material was not optimised for use in a cell structure. The data on the material, provided by the manufacturer, are as follows:

| | |
|---|---|
| Total grammage (g/m$^2$) | 480 |
| Grammage of activated carbon (g/m$^2$) | 350 |
| Thickness (mm) | 1.35 |

From the material obtained, having a thickness of 1.35 mm, strips (spacers) having a width of 3–4 mm were cut and glued on a planar surface of the same material so that grooves of a width of 3–4 mm were left in between them (FIG. 1). The material manufactured in the above-mentioned way was wound into a spiral cellular structure with a diameter of 35 mm and length of 32 mm (FIG. 4), in which 52 flow channels were formed.

2. Methods of Measurement 2.1. Ozone Loading

The cellular structure was placed in a steel cylinder with an inner diameter of 35 mm. The steel cylinder was placed between two conical holders of aluminium which had branches for sampling. The filter was supplied by a mass flow controller with dry pressurized air which was supplemented with ozone with an ozone generator of Thermo Environmental Instruments Inc 165. The total air flow was 24 l/min and the pressure loss in the cell 25 Pa. The ozone content was measured before and after the cellular filter structure with an Environment SA O$_3$41M ozone analyzer based on the adsorption of UV light. The change in the ozone content was recorded with a data logger. The ozone content of the air supplied to the cell was from 0.112 to 0.120 ppm, and the temperature 20 . . . 22 C. The retention time calculated from the front face of the filter was 0.077 s.

2.2. Cyclohexane and Ozone Load

Another cellular structure manufactured in the way described in section 1 was loaded with a mixture of cyclohexane and ozone. The cyclohexane was produced by bubbling cyclohexane in two consecutive gas washing bottles, after which it was mixed into air purified with a gas filter (relative humidity 40–60% and temperature 20 . . . 24 C.). The ozone was produced with a RedO$_3$x Plus ozone generator. Air was drawn in 25 l/min through the cellular structure by means of a sampling pump. The total air flow that had passed through the cellular structure passed through the measuring chamber of a Miran 1A infrared gas analyzer. The Miran was used to measure the cyclohexane content. The ozone content was measured with an Environment SA O$_3$41M ozone analyzer. The cyclohexane content of the air supplied to the cellular structure was 7.5 ppm and the ozone content 0.5 ppm. The retention time calculated from the front face of the filter was 0.074 s.

2.3. Toluene Load

Cellular filter structures loaded with ozone and cyclohexane were both placed, one after the other, in the same steel cylinder so that a gap of ca. 5 mm was left between them. Hot air (temperature above 80° C.) was led through the cellular structure to regenerate the cellular structure. After the regeneration, the cells were loaded with toluene. Toluene was produced by bubbling toluene in a vessel placed in water bath. The toluene produced was led to an air flow, from which 18.5 l/min was taken through the cellular structure via a sampling pump. The total air flow that had passed through the cellular structure passed through the measuring chamber of Miran 1A. The Miran was used to measure the toluene content. The toluene content before the cell was 20–22 ppm. The retention time calculated from the end face of the filter was 0.20 s.

A toluene loading was also made with commercial cylindrical activated carbon granules (diameter 4 mm and average length ca. 5 mm). The granules were placed in a box with front face dimensions of 430×170 mm and depth of 80 mm. The front faces were provided with perforated plates. The air flow through the filter was 35 l/s and the pressure loss 160 Pa. The toluene content before the cell was 20–22 ppm. The retention time calculated from the front face of the filter was 0.17 s.

3. Results

The results of the measurements on permeation and loading of the cellular structure are presented in FIGS. 10–12, where FIG. 10 shows the change in the flow through the cellular structure under ozone loading, FIG. 11 shows the change in the flow through the cellular structure under cyclohexane and ozone loading, and FIG. 12 shows the change in the flow through the cellular structure and a known filter under ozone loading. The figures illustrate the change in the flow through the cellular structure as a function of time. Permeation to ozone under cyclohexane and ozone load was measured only at the beginning of the loading.

4. CONCLUSIONS

The results of the measurements on the cellular filter structure are promising, considering that the material was not optimised to the use in question. The permeation of the cellular filter structure can be reduced considerably by extending the retention time in the filter. The retention time can be adjusted by selections of the structure length, front face area and air flow. Increasing the cellular structure length will increase the pressure loss, but this is possible because in the tests made, the pressure loss of the cellular structure was low.

What is claimed is:

1. Filter for gases, provided with elongated flow channels (3) which are at least partly formed by superimposing material layers (1) between which the flow channels (3) are formed so that their starting ends are open to a gas inlet (A) and their terminal ends are open to a gas outlet (B), wherein the gas flow between the starting ends and the terminal ends in the channels (3) is arranged parallel to the planes of the material layers (1), and the layers contain an adsorbent in which impurities are adsorbed from the flow in the channels (3), characterized in that the material layers have, on top of each other, at least one support layer (1a) and a porous adsorbent material layer (1b) kept in place by the support layer (1a), and that the channels (3) are formed between spacers (2), or between waves obtained by corrugating the material layer (1) of a substantially even thickness, the spacers (2) or waves constituting elevated areas which deviate from the main direction of the material layer (1) and keep the material layers (1) separate at the channels (3) and contain porous adsorbent material in their inside, and that the channels (3) are enclosed on all sides by porous walls through which there is a flow connection to the adsorbent material surrounding the channels on all sides.

2. The filter according to claim 1, characterized in that the support layer (1a) is porous.

3. The filter according to claim 2, characterized in that the adsorbent material layer (1b) is placed between two porous support layers (1a).

4. The filter according to claim 2 characterized in that the porous support layer (1a) is a layer formed of fibres.

5. The filter according to claim 4, wherein said fibres are selected from the group consisting of fibre gauze and paper-permeable to gases.

6. The filter according to claim 2, characterized in that a corrugated material layer (W) comprises at least one corrugated porous support layer (1a) and porous adsorbent material on top of the same, wherein the flow channels (3) are formed on both sides of the corrugated material (W).

7. The filter according to claim 1, characterized in that the spacers (2) separating the material layers (1) consist of thicker elongated areas of the adsorbent material layer (1b).

8. The filter according to claim 1, characterized in that the spacers (2) separating the material layers (1) are placed between the layers (1) as strips separate from the material layers (1).

9. The filter according to claim 8, characterized in that the spacers (2) are formed of strips separated from the same planar material of which the material layers (1) consist.

10. The filter according claim 1, characterized in that the porous adsorbent material layer (1b) consists of separate adsorbent particles.

11. The filter according to claim 10, wherein said separate adsorbent particles are selected from the group consisting of granular elements and fibrous elements.

12. The filter according to any of the claim 1, characterized in that the porous adsorbent material is activated carbon.

13. The filter according to claim 1, characterized in that it consisits of superimposed parallel material layers (1) which constitute a stack-like structure.

14. The filter according to claim 1, characterized in that it is formed by winding one or several material layers (1; W, S) into a form that is spiral in a cross-section perpendicular to the flow channels (3).

* * * * *